(12) United States Patent
Kirn

(10) Patent No.: US 7,626,451 B2
(45) Date of Patent: Dec. 1, 2009

(54) DATA DEMODULATION USING AN ASYNCHRONOUS CLOCK

(76) Inventor: Larry Kirn, 1602 S. Shore Dr., Apt. D1, East Lansing, MI (US) 48823

( * ) Notice: Subject to any disclaimer, the term of this patent is extended or adjusted under 35 U.S.C. 154(b) by 756 days.

(21) Appl. No.: 10/649,218

(22) Filed: Aug. 26, 2003

(65) Prior Publication Data
US 2004/0104766 A1 Jun. 3, 2004

Related U.S. Application Data

(60) Provisional application No. 60/405,914, filed on Aug. 26, 2002.

(51) Int. Cl.
*H03K 9/08* (2006.01)
*H03M 5/08* (2006.01)
(52) U.S. Cl. .......................... 329/312; 341/53
(58) Field of Classification Search ................. 329/312; 375/238; 341/53
See application file for complete search history.

(56) References Cited

U.S. PATENT DOCUMENTS

| | | | |
|---|---|---|---|
| 3,676,699 A | 7/1972 | Warren | 307/234 |
| 3,737,632 A | 6/1973 | Barnes | 235/61.11 E |
| 3,760,412 A * | 9/1973 | Barnes | 341/53 |
| 4,061,975 A * | 12/1977 | Sugai | 375/238 |
| 4,065,765 A * | 12/1977 | Wagner | 341/53 |
| 5,905,406 A | 5/1999 | Sugden et al. | 329/312 |
| 6,169,765 B1 * | 1/2001 | Holcombe | 375/238 |
| 7,466,770 B2 | 12/2008 | Kirn | 375/340 |
| 2001/0055323 A1 | 12/2001 | Rowett et al. | 370/537 |

FOREIGN PATENT DOCUMENTS

JP    05327788 A    * 12/1993

* cited by examiner

*Primary Examiner*—Joseph Chang
(74) *Attorney, Agent, or Firm*—Dorsey & Whitney LLP

(57) ABSTRACT

A method and accompanying circuitry for asynchronous data demodulation uses sorted pulsewidth measurement based on an asynchronous clock. Lock-on of the data stream by such a system is accomplished by measured pulsewidth, rather than inferred frequency. The method broadly comprises the steps of measuring a temporal aspect of the asynchronous clock, and locking onto the data stream in accordance with the measured periods. In the preferred embodiment, the temporal aspect is a ratio of measured periods. Conveniently, a ratio of 2:1 may be used.

12 Claims, 1 Drawing Sheet

DATA DEMODULATION USING AN ASYNCHRONOUS CLOCK

REFERENCE TO RELATED APPLICATION

This application claims priority to U.S. Provisional Patent Application Ser. No. 60/405,914, filed Aug. 26, 2002, the entire content of which is incorporated herein by reference.

FIELD OF THE INVENTION

This invention relates generally to asynchronous data encoding and, in particular, to the use of an asynchronous clock to reliably demodulate a pulsewidth-modulated data stream.

BACKGROUND OF THE INVENTION

Many serial data protocols and mass storage devices rely upon asynchronous data encoding using multiple relative pulsewidths. Data is represented by two or more pulsewidths in a stream, usually with known fixed relative ratios. The base clock used is inferred by the data itself, rather than being separately provided.

Typical decoding methods for such data streams typically regenerate a clock frequency from the data stream, and count that clock per data state or transition to demodulate the data. This requisite clock regeneration step, however, introduces complexity and cost into systems with existing asynchronous clocks.

A need exists for a method to use an asynchronous clock to reliably demodulate a pulsewidth-modulated data stream.

SUMMARY OF THE INVENTION

This invention resides in a method and accompanying circuitry for asynchronous data demodulation using sorted pulsewidth measurement based on an asynchronous clock. Lock-on of the data stream by such a system is accomplished by measured pulsewidth, rather than inferred frequency.

The method broadly comprises the steps of measuring a temporal aspect of the asynchronous clock, and locking onto the data stream in accordance with the measured periods.

In the preferred embodiment, the temporal aspect is a ratio of measured periods. Conveniently, a ratio of 2:1 may be used.

DETAILED DESCRIPTION OF THE INVENTION

Figure 1:
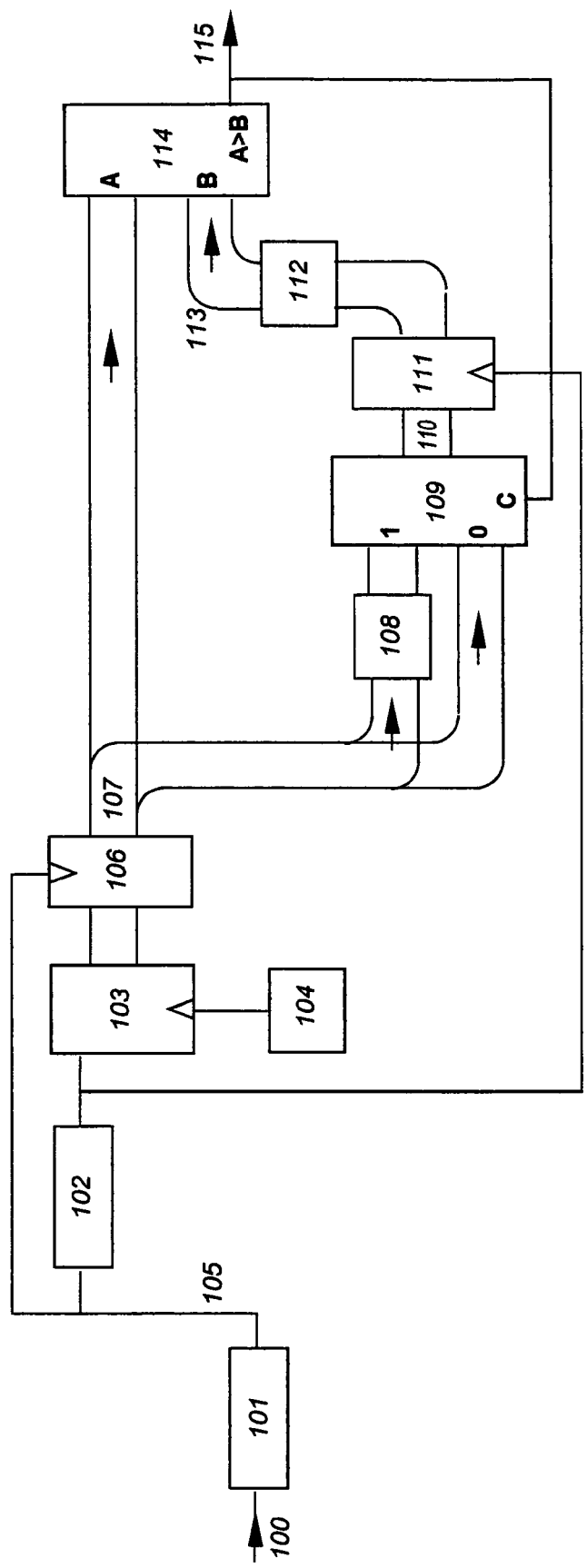
FIG. 1 is a block diagram showing a preferred embodiment of the present invention.

Referring now to FIG. 1, edge detector 101 receives as input serial data stream 100. For the purpose of this disclosure, the serial data stream 100 is assumed to convey binary information by differential time between state transitions, such that a binary '1' is indicated by a time period between two transitions double the time period used to indicate a binary '0'. Up-counter 103 receives its clock from free-running clock oscillator 104, the output frequency of which is preferably many times that of the highest frequency present in data stream 100.

At each transition of data stream 100, edge detector 101 outputs a very short duration transition pulse 105 to the clock input of latch 106, and delay 102. Delay 102 passes a delayed version of transition pulse 105 to the reset input of counter 103 and the clock input of Filter 111. The parallel output of counter 103 is latched by latch 106 upon receipt of each clock pulse. In that each transition pulse 105 latches the value of counter 103 and then resets counter 103 after the delay imposed by delay 102, the output 107 of latch 106 represents the width, in clock 104 pulses, between the previous two data transitions of data stream 100. This width 107 is input to the 'A' input of comparator 114, divider 108, and the '0' input of multiplexer 109.

Divider 108 presents a value equal to half that of width 107 to the '1' input of multiplexer 109. The control input of multiplexer 109 is driven by the eventual output 115 of the demodulator, which indicates a binary '1' for a long inter-transition period and a binary '0' for a short period. Connected in this way, multiplexer 109 then outputs either the value of a detected short period or half the value of a detected long period, hence the minimum multiplexer measurement, to lowpass filter 111.

The divisor value of '2' for divider 108 reflects the ratio of incoming differential periods. The output of filter 111 is updated slightly after each data stream 100 transition by the pulse at its clock input noted earlier. This average minimum pulsewidth value is multiplied to 150 percent by multiplier 112 and presented to the 'B' (reference) input of comparator 114. The multiplicand '1.5' for multiplier 112 is chosen to represent the median of the ratio of incoming differential periods.

Comparator 114 compares the incoming period measurement 107 with this reference average median period to determine if the incoming period is closer to the average minimum period or twice the average minimum period. The binary result 115 of comparator 114 then represents the demodulated value of incoming data stream 100.

Note that demodulation is effected by ratios of measured periods, thus obviating any synchronous clocks or frequency tracking. Although a ratio of 2:1 is illustrated, it will apparent to one of skill that other ratios and/or number of modulation states will benefit as well from the invention described herein.

I claim:

1. A method comprising:
   counting clock pulses between two signal transitions of a data stream including pulse widths of a first length and pulse widths of a second length to generate a width value;
   comparing the width value with a median pulse width value corresponding to a length between the first length and the second length, the median pulse width value based in part on a previously demodulated pulse width;
   outputting a digital signal indicative of the comparison; and
   generating a revised median pulse width value using the width value in part by dividing the width value by a first factor to generate a divided value, selecting either the divided value or the width value as a minimum pulse width based in part on the digital signal output, and multiplying the minimum pulse width by a second factor to generate the median pulse width value.

2. The method according to claim 1 wherein the second length is twice as long as the first length, the first factor equal to two, and the second factor equal to 1.5.

3. The method according to claim 1 wherein the act of selecting either the divided value or the width value is performed by a multiplexor, the method further comprising clocking the multiplexor using the digital signal output.

4. The method according to claim 3 further comprising filtering the output of the multiplexor.

5. The method according to claim 4 further comprising clocking a filter used to perform the act of filtering with a delayed signal based on at least one of the signal transitions.

6. An apparatus comprising:
- a counter configured to count clock periods between two signal transitions in a data stream including pulse widths of a first length and pulse widths of a second length, the counter configured to output a width value corresponding to a number of clock periods between the two signal transitions;
- a comparator configured to receive the width value and compare the width value with a median pulse width and output a digital signal based on the comparison, the median pulse width based in part on a width between two previous transitions of the data stream;
- a divider configured to divide the width value by a first factor;
- a multiplexor configured to receive the width value, the divided width value, and the output digital signal, the multiplexor configured to output either the width value or the divided width value based in part on the output digital signal; and
- a multiplier configured to receive either the width value or the divided width value output by the multiplexor and multiply the received signal by a second factor to generate a revised median pulse width.

7. The apparatus according to claim 6 wherein the second length is twice as long as the first length, the first factor equal to two, and the second factor equal to 1.5.

8. The apparatus according to claim 6 further comprising a filter coupled to the multiplexor and the multiplier, the filter configured to filter the multiplexor output.

9. The apparatus according to claim 8 wherein the filter is configured to receive a delayed signal based in part on at least one of the signal transitions, the filter configured to filter the multiplexor output responsive to the delayed signal.

10. The apparatus according to claim 9 further comprising:
- an edge detector configured to receive the pulse-width modulated data stream and detect the two signal transitions;
- a delay element coupled to the edge detector and configured to generate the delayed signal based on detection of the at least one of the signal transitions.

11. The apparatus according to claim 10 further comprising a latch coupled to the counter, the latch configured to receive an indication of a detected signal transition from the edge detector and, responsive to the indication, output the number of clock periods between two data periods to the divider and the multiplexor.

12. The apparatus according to claim 6 further comprising a clock oscillator coupled to the counter, the clock oscillator configured to generate the clock cycles.

* * * * *

UNITED STATES PATENT AND TRADEMARK OFFICE
CERTIFICATE OF CORRECTION

PATENT NO. : 7,626,451 B2  Page 1 of 1
APPLICATION NO. : 10/649218
DATED : December 1, 2009
INVENTOR(S) : Larry Kirn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Second Day of November, 2010

David J. Kappos
*Director of the United States Patent and Trademark Office*